March 8, 1960   H. MERKEL   2,927,853
METHOD AND APPARATUS FOR PRODUCING SPECTRALLY PURE GALLIUM
Filed June 26, 1958
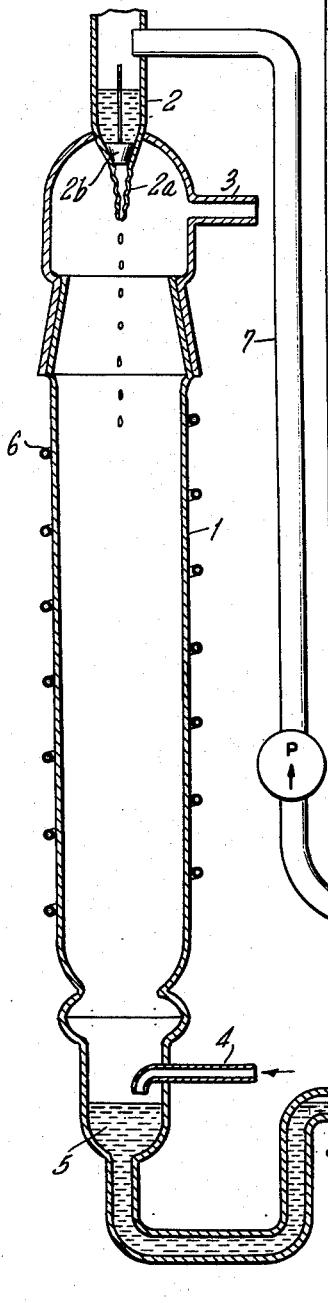
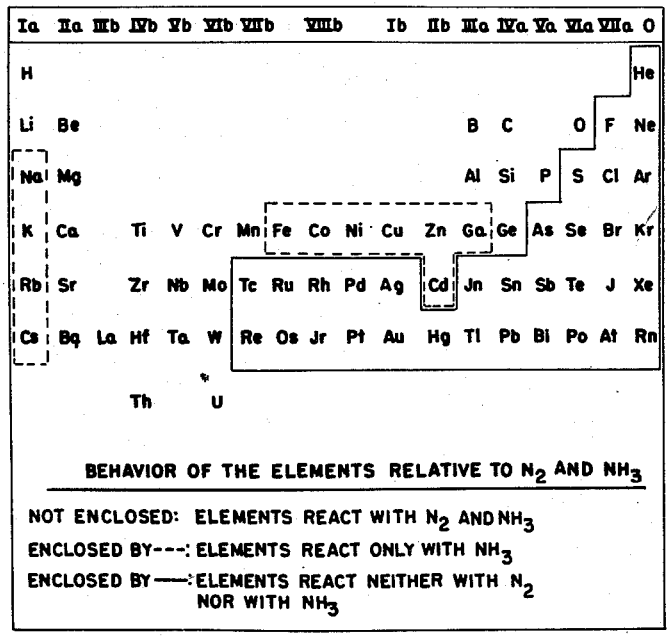
BEHAVIOR OF THE ELEMENTS RELATIVE TO $N_2$ AND $NH_3$
NOT ENCLOSED: ELEMENTS REACT WITH $N_2$ AND $NH_3$
ENCLOSED BY---: ELEMENTS REACT ONLY WITH $NH_3$
ENCLOSED BY——: ELEMENTS REACT NEITHER WITH $N_2$ NOR WITH $NH_3$
FIG. 2
FIG. 1

United States Patent Office 2,927,853
Patented Mar. 8, 1960

2,927,853

METHOD AND APPARATUS FOR PRODUCING SPECTRALLY PURE GALLIUM

Hans Merkel, Erlangen, Germany, assignor to Siemens-Schuckertwerke Aktiengesellschaft, Berlin-Siemensstadt, Germany, a corporation of Germany Application June 26, 1958, Serial No. 744,781

Claims priority, application Germany August 1, 1957

13 Claims. (Cl. 75—84)

My invention relates to a method and apparatus for producing spectroscopically pure gallium.

The purest gallium now obtainable commercially always contains spectroscopically ascertainable quantities of aluminum and iron, and in some cases also traces of magnesium and titanium. These impurities, if at all removable by the known purifying methods, can be eliminated only with extreme difficulty and great expense. This is because it is in most cases necessary in the final stage of the purifying method to obtain the gallium by electrolysis of alkaline solutions of carefully purified gallium compounds; but the impurities in the alkalies used for this purpose, particularly iron and aluminum, are precipitated together with the gallium. The zone-melting method, successfully applicable in other cases for purifying metals, fails to yield the desired result with gallium.

It is an object of my invention to devise a method for purifying gallium beyond the spectroscopically ascertainable degree of purity.

Another, more particular object, is to provide a very economical method for eliminating, from gallium, the above-mentioned impurities: Al, Fe, Mg, Ti, and also impurities such as Li, Be, Ca, Sr, Ba, B, La, Ce, Pr, Nd, Si, Ge, Zr, Th, V, Nb, Ta, Cr, U, Mn, Co, Ni, and, if need be, also Cu, Zn and Cd.

To achieve these objects, in accordance with a preferred form of my invention, finely distributed gallium-metal droplets are subjected to a gaseous flow of nitrogen or ammonia at a temperature preferably from about 400° C. to about 1200° C. or above. As a result, the metallic impurities of gallium are converted into nitride and can readily be removed in form of a slag.

The choice of purifying gas and operating temperature depend upon the kind of the impurities present.

It is advantageous to use nitrogen when certain impurity elements are present, for example Be, B, Ti, which for the formation of the nitride require an operating temperature up to about 1200° C.

Employment of ammonia gas is advantageous with impurity metals that form nitrides with particular ease. When ammonia is employed it is disadvantageous, or there is no advantage, to select an operating temperature above 800° C., because this would cause the occurrence of losses, due to formation of gallium nitride. With the aid of ammonia at 800° C., Mg, Al, Fe, and Mn can be removed, for example.

The method can also be carried out with atomic, highly active nitrogen at a considerably lower operating temperature. However, the expenditure in equipment is considerably greater in this case.

The drawing illustrates, schematically, one embodiment of an apparatus for performing the method in accordance with the invention.

The upper portion of a tubular reaction vessel 1 is provided with a device 2 for supplying the gallium to be purified, in the form of droplets which enter into the vessel 1 through a dropper nozzle 2a. The vessel 1 is provided with a gas outlet 3 near the top, and with a lower gas inlet 4, and a collecting space 5 for the purified gallium.

The gallium to be purified is supplied into the storage space of the dropper device 2 and passes in fine distribution, in the form of droplets, into the reaction space in vessel 1. A current of nitrogen or ammonia gas is passed from inlet 4 to outlet 3 through the vessel in a direction opposite to the travel path of the gallium droplets. During this process, the metallic impurities of the gallium are converted to nitrides. The process is repeated several times. Starting with commercially pure gallium, still containing the above-mentioned spectroscopic amount of impurities, a spectroscopically pure gallium is obtained with approximately twenty repetitions.

The device may be accommodated within a furnace to heat it to reaction temperature. However, the device may also be provided with a direct electric resistance heater 6.

The method described also simultaneously eliminates impurities of comparatively high volatility, for example cadmium or zinc, this being partially also due to vaporization.

The illustrated apparatus may be used for a continuous repetition of the method. For this purpose the collector space 5 may be connected with the storage space of the dropper device 2 through a pumping system and conduit 7. A pump is indicated at P. A capillary tube 8 is connected to conduit 7; it prevents circulation of impurities.

*Example*

300 grams of commercially available gallium, containing spectroscopically ascertainable impurities of iron, aluminum and magnesium, are subjected to a counter-flow of ammonia gas in the above-described device at a temperature of 800° C. After twenty passages through the device the resulting gallium is spectroscopically pure and weighs approximately 290 grams.

An amplified explanation of the principle of the invention follows.

Fig. 2 indicates the behavior of molecular $N_2$ relative to the other elements of the periodic table, in a purely thermal reaction.

At normal temperature only Li and finely distributed Ca react with $N_2$. With all other elements, a higher temperature is necessary for obtaining nitride formation.

This reactional inertia of $N_2$ is believed to be mainly due to the extremely strong bond of the two N-atoms in the molecule, for whose splitting an energy of about 170 Kcal./mole is required. By electrical excitation, resulting in the production of the very reactive N-atoms, the reactivity of nitrogen in the present process can be greatly increased. Another and very simple way of producing the N-atoms needed for the nitride formation, is the above-described use of gaseous $NH_3$, which when acting upon metals splits partially into N-atoms and H-atoms at moderately elevated temperature.

The temperatures at which nitride formation with $N_2$ commences with the individual elements are shown in Table 1.

Table 1.—Minimum temperature in ° C. for the initiation of nitride formation with $N_2$

| | |
|---|---|
| Li | −55 |
| Be | 900 |
| Mg | 600 |
| Ca | 20 |
| Sr | 300 |
| Ba | 190 |
| B | 1200 |
| Al | 820 |
| C | [1] >3000 |
| Si | 1250 |
| Ge | 800 |
| P | [2] 850 |
| O | very high t. |
| La | 500 |
| Ce | 600 |
| Pr | 700 |
| Nd | 700 |
| Ti | 800 |
| Zr | 700 |
| Th | 800 |
| Cr | 500 |
| Mo | 500 |
| W | 600 |
| U | 1000 |
| Mn | 390 |
| V, Nb, Ta | 500–600 |

[1] C: in the carbon arc.
[2] P: at 1000 atm. $N_2$-pressure.

For the reaction with ammonia, the required temperature in general is considerably lower. Moreover it is possible to obtain nitride formation with $NH_3$ with the following elements not reacting with $N_2$:

Table 2.—Nitride formation with $NH_3$ at ° C.

| | |
|---|---|
| Fe | ~500 |
| Co | ~500 |
| Ni | ~550 |
| Cu | [1] ~300 |
| Zn | [1] ~600 |
| Cd | [1] ~600 |
| Ga | 900 |

[1] Cu, Zn and Cd form easily disassociable nitrides.

The alkali metals react with gaseous ammonia at elevated temperature with formation of amide.

Since gallium reacts with $NH_3$ only from about 900° C. on, and does not react with $N_2$ even at highest temperatures, it is feasible to remove the nitride forming elements from finely distributed Ga by treating it with $NH_3$ at about 800° C., or with $N_2$ at temperatures in the neighborhood of 1200° C. Iron, always occurring as an impurity in raw gallium, reacts only with $NH_3$. For that reason, purification with $NH_3$ is generally preferable to the use of $N_2$. According to my experience, not only iron but practically all other impurities occurring in commercial gallium, can be removed by treatment with $NH_3$ at 800° C. Only when a few only rarely occurring impurity elements, such as for example Be, B, U, are present in the raw gallium, is it necessary to operate with $N_2$ at 1200° C.

The impurities converted to nitrides collect after purification on the gallium surface in the form of a thin skin which can be kept back by pouring or drawing off the gallium through a capillary of about 2–3 mm. inner width.

The processing of gallium with $N_2$ or $NH_3$ can be performed, in principle, by the following two methods:

(1) Passing the nitrogenous gas current through a body of heated gallium;

(2) Passing the gas current about fine gallium droplets which drop down in the interior of the vertical tube heated to the processing temperature. This process is described above.

The second method is more advantageous and more effective for the following reasons:

(1) Gallium does not touch the hot vessel wall from which it could take up impurities;

(2) The purifying gas is always available in great excess;

(3) Each gallium droplet passes through a temperature range from the operating temperature down to approximately room temperature, within which range the optimum nitride-formation temperature for each impurity element is included;

(4) The heating time for each gallium droplet is only short so that elements which form easily disassociated nitrides are at least partially eliminated (Cu, Zn), in addition to the other elements;

(5) The droplet method can be carried out continuously by insertion of a pumping system, involving a repetition of the individual method step, while the impurities already converted into nitrides can be kept from circulating by means of a capillary of suitably chosen dimension.

As already described, the purification of gallium is performed with the aid of equipment shown in Fig. 1. Further details thereof are now given.

The apparatus comprises a reaction tube 1 of quartz, approximately 800 mm. long and of 30 mm. outer diameter. The tube carries on its top a part comprised of Jena apparatus-glass provided with a lateral gas outlet pipe 3. Located in the top portion is a dropper device 2a with a ground-in seal, with the aid of which fine gallium droplets can be produced. Located at the bottom of the reaction tube is the collecting space 5 for the gallium into which the gas inlet pipe 4 extends. The lower portion of the collecting space tapers down to a diameter of about 6 mm. and, as apparent from the figure, is bent at a right angle in four places, so that the gallium, when it has collected in the container up to a certain height, can continuously drain into collecting vessel 10.

Before placing the purifying apparatus into operation, the collecting space at the bottom of the tube is provided with a small quantity of gallium metal which seals the apparatus at the bottom. Then the air is forced out of the apparatus by introducing purified $NH_3$, and the reaction tube is heated to 800° C. The temperature is measured at the outer tube wall. Now approximately 300 g. raw gallium are supplied into the container of the dropper device at the top, and the dropper opening is so adjusted that fine gallium droplets will run out in rapid sequence. No heating device is required for the dropper device itself. It is sufficiently heated by radiation from the reaction tube heated at 800° C., so as to keep the gallium liquid (melting at 30° C.). The comminution, into droplets, of 300 g. gallium, in the abovedescribed apparatus, requires approximately 15 minutes. The process is best repeated several times.

From 300 g. raw gallium, with spectroscopically ascertainable quantities of iron, aluminum, titanium and magnesium, there were obtained approximately 290 g. spectrally pure gallium after 20 passages through the ammonia tower.

The iron content in the raw gallium and in the purified gallium was determined in accordance with the iron per chlorate method:

Raw gallium: $5.5 \times 10^{-4}\%$
Purified gallium: $0.0 \times 10^{-4}\%$ (i.e. the iron content was below the ascertainable limit)

When copper was present in the raw gallium, a reduction of the copper content down to a few parts per million could be ascertained spectroscopically.

The zinc content (determined with Dithizon) was reduced from $1.5 \times 10^{-3}\%$ in raw gallium down to $4 \times 10^{-4}\%$ in the purified gallium.

Ordinarily, appreciable or significant reaction between gallium and $NH_3$ occurs only from a temperature of about 900° C. on, upwardly. However, this is not a sharp temperature limit, because the reaction may initiate at somewhat lower temperatures. For this reason, it is recommended, and preferred, to employ a temperature not above about 800° C. when using ammonia gas. This is indicated above.

I claim:

1. A method for producing spectrally pure gallium, comprising finely distributing gallium metal in form of droplets, and contacting the droplets at a temperature of above about 900° C. with a current of atomic nitrogen gas, and separating the impurities converted to nitrides from the gallium.

2. A method of purifying gallium comprising contacting drops of molten gallium with a current of ammonium gas at about 400 to below 900° C., and separating the impurities converted to nitrides from the gallium.

3. A method of purifying gallium comprising contacting drops of molten gallium with a current of nitrogen gas at a temperature above about 900° C., and separating the impurities converted to nitrides from the gallium.

4. The method of claim 1, the temperature being at about 1200° C.

5. A re-cycling process for purifying gallium comprising dropping drops of molten gallium down through a reaction zone, passing a current of ammonia gas upwardly in contact with the falling drops, collecting the gallium and nitrided impurities below, separating the impurities converted to nitrides from the gallium, and returning the gallium to the above process for contact, in the form of molten drops, with ammonia gas, to increase the purity thereof, the temperature of the ammonia gas being sufficiently high to form nitrides with the impurities but being below the temperature at which the gallium reacts with the ammonia.

6. A re-cycling process for purifying gallium comprising dropping drops of molten gallium down through a reaction zone, passing a current of ammonia gas upwardly in contact with the falling drops, collecting the gallium and nitrided impurities below, separating the impurities converted to nitrides from the gallium, and returning the gallium to the above process for contact, in the form of molten drops, with ammonia gas, to increase the purity thereof, each falling drop passing through temperatures varying from a reaction range of 400–900° C. above to approximately room temperature below.

7. A re-cycling process for purifying gallium comprising dropping drops of molten gallium down through a reaction zone, passing a current of nitrogen gas upwardly in contact with the falling drops, collecting the gallium and a nitrided impurity below, separating the impurity converted to nitrides from the gallium, and returning the gallium to the above process for contact, in the form of molten drops, with nitrogen gas, to increase the purity thereof, the temperature of the nitrogen gas being sufficiently high to form a nitride with an impurity.

8. A process for purifying gallium comprising contacting drops of molten gallium with a current of nitrogen gas, the temperature of the nitrogen gas being sufficiently high to react with an impurity in the gallium and separating the nitrogenized impurity from the gallium.

9. The process of claim 6, the nitride impurities being separated from the purified gallium by drawing off the purified gallium through a capillary.

10. A process for purifying gallium, by reacting an impurity therein but substantially not the gallium, comprising contacting drops of molten gallium with a current of ammonia gas at a temperature at which the ammonia reacts with an impurity in the gallium, but not so high as to incur more than slight losses of gallium by reaction of the ammonia therewith, and separating the nitrogenized impurity from the gallium.

11. A process for purifying gallium, by reacting an impurity therein but substantially not the gallium, comprising contacting drops of molten gallium with a current of gas containing a substance of the group consisting of ammonia and nitrogen at a temperature at which the substance reacts with an impurity in the gallium but not so high as to incur more than slight losses of gallium by reaction of the substance therewith.

12. A method of purifying gallium comprising contacting drops of molten gallium with a current of ammonia gas at about 400° to about 800° C.

13. A re-cycling process for purifying gallium comprising dropping drops of molten gallium down through a reaction zone, passing a current of ammonia gas upwardly in contact with the falling drops, collecting the gallium and nitrided impurities below, separating the impurities converted to nitrides from the gallium, and returning the gallium to the above process for contact, in the form of molten drops, with ammonia gas, to increase the purity thereof, each falling drop passing through temperatures varying from a reaction range of about 400° to 800° C. above to approximately room temperature below.

No references cited.